Sept. 28, 1954 P. J. O'BRIEN ET AL 2,690,387
AMORPHOUS INORGANIC COMPOSITIONS AND METHOD OF PRODUCING SAME
Filed Aug. 29, 1950
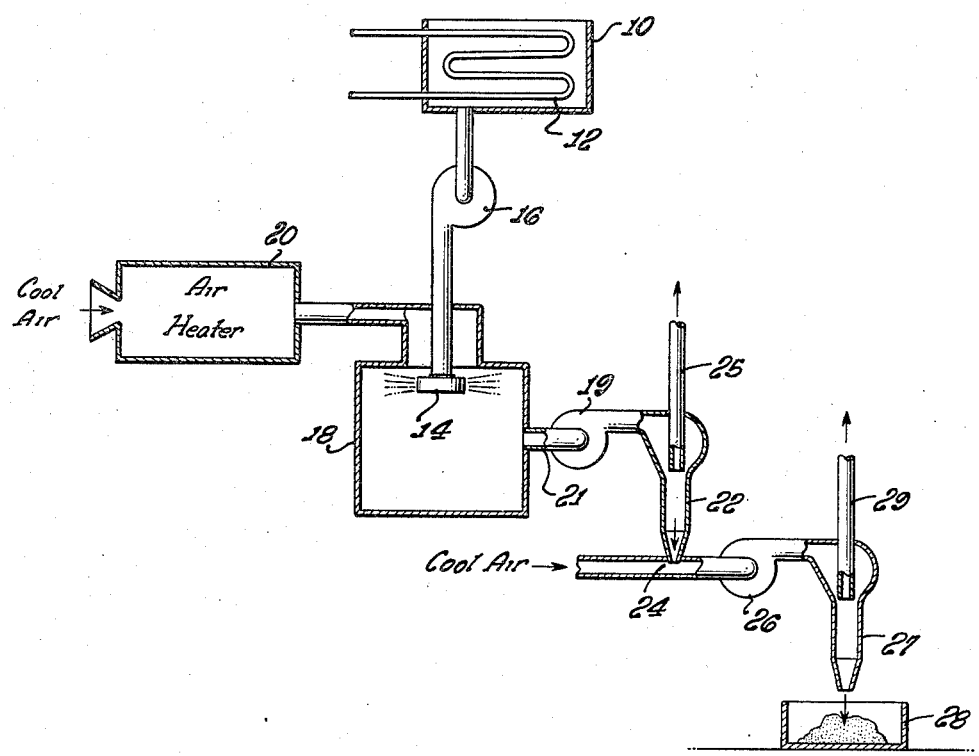
PATRICK J. O'BRIEN,
GEORGE A. CONNELL,
INVENTORS.
BY
ATTORNEYS.

Patented Sept. 28, 1954

2,690,387

UNITED STATES PATENT OFFICE 2,690,387

AMORPHOUS INORGANIC COMPOSITIONS
AND METHOD OF PRODUCING SAME

Patrick J. O'Brien, Long Beach, and George A. Connell, Los Angeles, Calif., assignors to Borax Consolidated, Limited, London, England, a corporation of Great Britain and Northern Ireland Application August 29, 1950, Serial No. 181,958

7 Claims. (Cl. 71—2.2)

This invention is concerned generally with inorganic water soluble materials and their preparation in such physical form that they are stable and non-caking under practical conditions of storage, and have novel and useful characteristics when utilized to form solutions. Among the characteristics exhibited by such compositions is the fact that they are particularly readily soluble, and are directly soluble to a higher concentration than previously available materials of corresponding overall chemical composition.

Many water soluble materials, in their previously available forms, have a relatively large negative heat of solution in water. When such materials are dissolved, the absorption of heat tends to cool the solution, impeding the process of dissolution. Particularly when a solution of relatively high concentration is required, such cooling may be quite troublesome. Materials prepared in accordance with the present invention have the novel and outstanding advantage that their heat of solution is relatively low, or even positive. Solution of such materials can be carried out even to high concentrations without appreciable reduction of the original water temperature, or without any temperature reduction at all.

A typical example of a commercial operation in which such considerations are of great practical importance is found in the preparation of water solutions for use in killing weeds, defoliating plants, and the like. For that purpose, relatively concentrated solutions of sodium chlorate and sodium borate are frequently used, the borate performing the necessary function of preventing fire risk, as well as prolonging the weed-killing effectiveness of the composition. The utilization of calcined borax as a component in solid compositions for preparing supersaturated solutions for weed killing and other purposes is described and claimed in the copending patent application entitled "Supersaturated Borax Solutions and Methods and Compositions for Producing Same," Serial No. 117,878, filed September 26, 1949, by George A. Connell and issued as U. S. Patent No. 2,643,947 on June 30, 1953. The stabilization of such supersaturated solutions by certain stabilizing agents is described and claimed in the copending patent application of Donald S. Taylor and George A. Connell, Serial No. 117,806, filed September 26, 1949, under the title, "Stabilization of Borax Supersaturation in Solutions," and issued as U. S. Patent No. 2,622,810 on December 15, 1953.

Solutions for use in weed killing are ordinarily prepared in the field with relatively simple portable equipment. It is usually inconvenient or highly impractical to heat the water, which may be initially quite cold. The rather large negative heats of solution of the solid chlorate and borates that have hitherto been employed for preparing such solutions produce a further reduction of water temperature. That reduction may typically be as great as 10° or 15° F. The resulting solution temperature is often so low that the proper concentration of solutes is difficult or impossible to attain.

It has been discovered that such solid compositions as sodium chlorate and various sodium borates can be prepared in such form that they can be dissolved more readily and to a higher concentration than the previously available materials. Moreover, solution of the new materials does not lower the solution temperature, but actually raises it slightly, promoting solution and greatly reducing the chance that an undissolved residue may remain in the dissolving tank. A further advantage of the new form for such compositions is the fact that the various ingredients are homogeneously distributed not only throughout the material as a whole, but even within each particle, thus making segregation of the ingredients impossible. That prevention of segregation is of particularly critical importance when one ingredient is sodium chlorate, which, by itself, may produce a serious fire hazard.

Chlorate and borate materials of the type indicated are produced in accordance with the present invention by first forming a water solution of the various ingredients in the proportions in which they are desired to appear in the final solid composition. Water is then evaporated very rapidly from that solution, leaving the solutes in solid form. To insure rapid removal of water from the solution, the latter may be spread at elevated temperature into a thin film, as on a hot plate or on the heated roll of a drum dryer; or is otherwise divided to increase the relative surface area through which evaporation may take place. The preferred method of evaporation is by spraying the solution at moderately elevated temperature into a stream of hot and relatively dry air. The droplets of the spray become substantially dry, and preferably also are cooled nearly to room temperature, while still carried in the air stream and before striking any solid wall of the enclosure. Each droplet thus produces a generally spherical solid particle containing each ingredient in the initial solution proportions. Although superficially dry, the resulting solid composition may include an appreciable proportion of water, the exact amount of water and the average size of the particles depending primarily upon the particular spraying and drying conditions used.

A clear understanding of the invention and its further objects and advantages will be had from the following description of a typical preferred manner in which it may be carried out, it being understood that many changes may be made in specific details of the described procedure and that equivalent methods may be used without departing from the scope of the invention. The accompanying drawing illustrates schematically a typical spray drying apparatus, by which the invention may be carried out in its preferred form. For clarity of illustration, certain well known practical details of the apparatus are omitted in the drawing. The required ingredients are first dissolved to form an aqueous solution, stored in supply tank 10. That solution may be heated, as by steam coil 12, to increase the solubility of the solutes, it being in general economical to employ as highly concentrated a solution as possible. Under suitable conditions, the feed solution may be supersaturated.

Solution is fed from tank 10 to a spray nozzle 14, preferably of centrifugal type, as by gravity or by a suitably powered pump indicated at 16, forming a fine mist of solution within a spray chamber 18. Air or other suitable gas is circulated continuously, as by a power driven fan 19, through a heater 20, through spray chamber 18 and to a separator, preferably of cyclone type, indicated at 22. Conditions are so adjusted that the spray droplets from nozzle 14 become superficially dry while suspended in the stream of hot air within drying chamber 18, forming an air suspension of particles of solid material. Those particles are carried with the air stream to separator 22, from which they are delivered at 24, the air being vented as at 25. A current of cool air is preferably drawn past the delivery point 24 of separator 22, redispersing and cooling the particles. As illustrated, a second fan 26 delivers that cool suspension to a second separator 27, from which the finally dried and cooled solid particles are deposited at 28, and the air is vented at 29.

For typical operation of the system of the type described, the solution is fed to spray nozzle 14 at a temperature of approximately 200° F. and at substantially saturated concentration. The air entering drying chamber 18 may have a temperature of the order of 700° F., depending somewhat upon the characteristics of the material being processed. With suitable regulation, the evaporation of water from the sprayed solution lowers that temperature to approximately 200 to 300° F. at outlet 21 from chamber 18. After resuspension of the particles in cool air at 24, that temperature may be further reduced to 150° or less before the particles reach separator 27, the solid material thus being delivered at 28 at approximately the latter temperature.

It has been discovered that when solutions of sodium borates, or of sodium borates and sodium chlorate, are spray dried by the general type of process described above, the resulting solid particles are found to go into solution very rapidly and to form clear solutions even at concentrations that represent quite extreme supersaturation with respect to borate. Furthermore, that solution takes place typically without any cooling of the water, and in many instances the heat of solution even raises the temperature of the water several degrees. All of those characteristics are highly desirable in numerous commercial products, of which weed killing preparations are typical.

Typical compositions, prepared in accordance with the present invention, are listed in the accompanying table under identifying symbols A to F. For each composition listed the ingredients from which the initial solution was prepared are given as per cent by weight of the solution.

| Composition | A | B | C | D | E | F |
|---|---|---|---|---|---|---|
| Hot Solution Made From: | | | | | | |
| Percent $NaClO_3$ | ------ | ------ | 21.5 | 16.2 | 14.2 | 17.0 |
| Percent $H_3BO_3$ | 36.3 | 34.4 | 25.6 | 27.9 | ------ | ------ |
| Percent $Na_2B_4O_7.10H_2O$ | 37.4 | 49.8 | 36.8 | 28.6 | ------ | ------ |
| Percent $Na_2B_4O_7.3.2H_2O$ | ------ | ------ | ------ | ------ | 8.0 | 7.6 |
| Percent $NaB_5O_8.5H_2O$ | ------ | ------ | ------ | ------ | 44.5 | 42.1 |
| Percent $H_2O$ | 26.3 | 15.8 | 15.7 | 27.3 | 33.3 | 33.3 |
| Product: | | | | | | |
| Percent $Na_2O$ | 13.45 | 15.02 | 10.45 | 9.9 | 11.8 | 10.2 |
| Percent $B_2O_3$ | 71.2 | 68.2 | 46.97 | 53.3 | 53.0 | 46.2 |
| Percent $NaClO_3$ | ------ | ------ | 34.93 | 28.2 | 25.2 | 34.9 |
| Percent $H_2O$ (calc) | 15.35 | 16.8 | 7.65 | 8.6 | 10.0 | 8.7 |
| $Na_2O/B_2O_3$ mol. ratio | 0.21 | 0.25 | 0.25 | 0.21 | 0.25 | 0.25 |
| Apparent density, gms./ml | 0.32 | 0.38 | 0.52 | 0.63 | ------ | ------ |

The chemical compositions of the respective final products, as determined by standard analytical procedures, are given in the table, as well as the apparent density and the molar ratio $Na_2O/B_3O_3$. The slightly greater proportion of $Na_2O$ in products A–D, as compared with the initial ingredients, is believed to be due to a barely noticeable contamination of the heated air with sodium tetraborate from the furnace 20 which was used in those particular runs. Samples of each of products A–D were submitted to X-ray analysis for crystal structure. No crystals whatever were found in products A, B and C, while product D contained only a trace of crystalline sodium chlorate and no crystalline borates. It is believed that the products may typically be considered to be solid solutions.

The listed products all contain some residual water, the molar ratio of $H_2O$ to $B_2O_3$ varying within the approximate range between 0.5 and 1.0. That water appears to be associated with the $B_2O_3$ content of the product, although its presence does not result in the appearance of any crystalline borates.

The method described is useful in preparing compositions over a range of composition proportions that is wider than the precise limits of the illustrative compositions presented in the table. In the compositions including chlorate it is preferred that the chlorate comprise not more than about 40% of the composition to avoid fire hazard, while the molar ratio $Na_2O/B_2O_3$ may vary from about 0.15 to about 0.3, and the composition may include from about 5% to about 20% $H_2O$. Compositions without chlorate may be prepared comprising between about 10 and about 20% $Na_2O$, between about 65 and about 80% $B_2O_3$ and between about 10 and about 20% $H_2O$.

The non-crystalline character of the typical materials listed is further evidenced by their tendency to become plastic at elevated temperatures. At normal temperatures, and when protected from moisture, the described materials are non-caking and otherwise physically and chemically stable. However, they tend to absorb water when exposed to the atmosphere, and dissolve very readily even in a relatively small proportion of water. For example, a product of the type represented by example E may be dissolved rapidly at 60° F. with agitation in proportions as high as 2 lbs. per gallon of water to form a supersaturated solution that remains clear for as long as two days. The concentration corresponding to normal equilibrium saturation is only approximately 0.2 lb. per gallon. At even much higher concentrations, such as 4 lbs. per gallon, a clear solution can be formed, indicating the production of a highly supersaturated solution by direct solution of the ingredients; but at such concentrations the solution is not ordinarily stable, crystals of borate gradually forming. However, in spite of the limited stability of such highly supersaturated solutions, it is sometimes useful to be able to directly dissolve the materials in question to such high concentrations, and the possibility of such solution greatly facilitates the rapid and convenient production of less concentrated solutions.

When a composition of the type represented by example F of the table is dissolved in water at room temperature in a concentration of 2 lbs. per gallon of water, a temperature increase of about 2° F. is observed. On the other hand, solution of a corresponding mixture of the original solid ingredients from which that product was prepared, including, for example, sodium chlorate, calcined borax and sodium pentaborate in the proportions indicated in the table, lowers the water temperature about 10° F. The temperature increase resulting from solution of the new amorphous products greatly aids the process of solution, in sharp contrast to the troublesome reduction of temperature caused by solution of the corresponding compositions that were previously available. The ability of the described products to go into solution rapidly, to a remarkably high concentration, and without appreciable reduction of the solution temperature is believed to result from the described novel physical nature of the compositions as contrasted with the previously available crystalline materials. That ready solubility is of great practical importance when large quantities of concentrated solutions are to be made up in the field, as is typically true for weed killing and defoliation of plants.

We claim:

1. A solid particulate composition of matter comprising sodium borate and sodium chlorate in substantially amorphous solid solution within each particle, the said composition being readily soluble in water without appreciable cooling of solution.

2. A solid particulate composition of matter as defined in claim 1 and containing at least about 25% sodium chlorate.

3. A solid particulate composition of matter as defined in claim 1 and having a molar ratio of $Na_2O$ to $B_2O_3$ between about 0.15 and about 0.3.

4. A solid particulate composition of matter as defined in claim 1 and containing at least about 25% sodium chlorate and having a molar ratio of $Na_2O$ to $B_2O_3$ between about 0.15 and about 0.3.

5. A solid particulate composition of matter comprising sodium borate and sodium chlorate in substantially amorphous solid solution within each particle, the said composition having a molar ratio of $Na_2O$ to $B_2O_3$ between about 0.15 and about 0.3, containing between about 5% and about 20% $H_2O$ and not more than about 40% $NaClO_3$, and the said composition being readily soluble in water without appreciable cooling of solution.

6. The method of producing a solid composition of matter adapted by solution in water to form a herbicidal and defoliant solution, said method comprising dissolving sodium borate and crystalline sodium chlorate in water in predetermined proportions, forming a fine spray of the resulting solution in a body of dry gas having an initial temperature of at least 400° F., whereby each spray droplet dries to form a solid particle, cooling the resulting solid particles to a temperature below about 170° F. while they are suspended in gas, and depositing the particles from the gas at the said cooler temperature to form a finely divided solid material, each particle of which includes borate and chlorate in substantially the said proportions, and which is substantially amorphous and is readily soluble in water with positive heat of solution.

7. The method of producing a solid composition of matter adapted by solution in water to form a herbicidal solution and having a positive heat of solution, said method comprising dissolving sodium borate and sodium chlorate in predetermined proportions to form a substantially saturated aqueous solution, finely dividing the solution and removing water rapidly from the finely divided solution at an elevated temperature to deposit the solutes in the form of an amorphous solid solution.

References Cited in the file of this patent

UNITED STATES PATENTS

| Number | Name | Date |
|---|---|---|
| 2,032,388 | Allen | Mar. 3, 1936 |
| 2,131,793 | Cramer et al. | Oct. 4, 1938 |

FOREIGN PATENTS

| Number | Country | Date |
|---|---|---|
| 539,705 | Germany | Dec. 1, 1931 |

OTHER REFERENCES

Hilgardia, December 1936, pages 411 and 412.

Mellor, "A Comprehensive Treatise on Inorganic and Theoretical Chemistry," vol. 5, pages 67 and 76 (1924).